United States Patent
Luo et al.

(10) Patent No.: US 9,536,638 B2
(45) Date of Patent: Jan. 3, 2017

(54) HALOGEN-FREE INSULATED CABLE MATERIAL USED FOR 125C IRRADIATION CROSS-LINKED EPCV PHOTOVOLTAICS AND A PREPARATION METHOD THEREOF

(71) Applicant: Jiangsu Dasheng Polymer Co., Ltd., Suzhou (CN)

(72) Inventors: Chaohua Luo, Suzhou (CN); Weiwei Fan, Suzhou (CN); Weiwei Fan, Suzhou (CN)

(73) Assignee: Jiangsu Dasheng Polymer Co., Ltd., Suzhou, JS (CN)

( * ) Notice: Subject to any disclaimer, the term of this patent is extended or adjusted under 35 U.S.C. 154(b) by 0 days.

(21) Appl. No.: 15/025,951

(22) PCT Filed: Jan. 14, 2014

(86) PCT No.: PCT/CN2014/070590
§ 371 (c)(1),
(2) Date: Mar. 30, 2016

(87) PCT Pub. No.: WO2015/043121
PCT Pub. Date: Apr. 2, 2015

(65) Prior Publication Data
US 2016/0217883 A1    Jul. 28, 2016

(30) Foreign Application Priority Data

Sep. 30, 2013   (CN) .......................... 2013 1 0462496

(51) Int. Cl.
| | |
|---|---|
| *H01B 3/46* | (2006.01) |
| *C08J 3/00* | (2006.01) |
| *C08J 3/28* | (2006.01) |
| *C08L 23/06* | (2006.01) |
| *C08L 23/08* | (2006.01) |
| *C08L 23/16* | (2006.01) |
| *H01B 7/295* | (2006.01) |
| *H01B 3/28* | (2006.01) |
| *H01B 3/44* | (2006.01) |
| *C08J 3/20* | (2006.01) |
| *C08J 3/22* | (2006.01) |
| *C08J 3/12* | (2006.01) |
| *C08J 3/24* | (2006.01) |

(52) U.S. Cl.
CPC ................. *H01B 3/46* (2013.01); *C08J 3/005* (2013.01); *C08J 3/12* (2013.01); *C08J 3/203* (2013.01); *C08J 3/226* (2013.01); *C08J 3/24* (2013.01); *C08J 3/28* (2013.01); *C08L 23/06* (2013.01); *C08L 23/08* (2013.01); *C08L 23/16* (2013.01); *H01B 3/28* (2013.01); *H01B 3/441* (2013.01); *H01B 3/448* (2013.01); *H01B 7/295* (2013.01); *C08J 2323/16* (2013.01); *C08J 2423/06* (2013.01); *C08J 2423/08* (2013.01); *C08J 2431/04* (2013.01); *C08J 2451/06* (2013.01); *C08J 2483/04* (2013.01); *C08L 2201/02* (2013.01); *C08L 2203/202* (2013.01); *C08L 2205/035* (2013.01)

(58) Field of Classification Search
CPC ............. C98L 3/203; H01B 3/46; C08L 23/16
See application file for complete search history.

(56) References Cited

FOREIGN PATENT DOCUMENTS

| | | | |
|---|---|---|---|
| CN | 10-2766293 | * | 11/2012 |
| CN | 102766293 | | 11/2012 |
| CN | 103524896 | | 9/2013 |

OTHER PUBLICATIONS

International Search Report of International App. No. PCT/CN2014/070590 dated Jun. 18, 2014.

* cited by examiner

*Primary Examiner* — Robert Harlan
(74) *Attorney, Agent, or Firm* — Bond Schoeneck & King, PLLC; George McGuire

(57) ABSTRACT

The present invention discloses a halogen-free insulated cable material used for 125° C. irradiation cross-linked EPCV photovoltaics and a preparation method thereof. The material is mainly prepared from the following raw materials based on weight parts: 5-20 parts of ethylene propylene diene monomer; 0-25 parts of polyethylene; 0-10 parts of ethylene-vinyl acetate copolymer; 1-5 parts of compatibilizer; 50-75 parts of aluminum hydroxide; 1-5 parts of stabilizer; 1-5 parts of silicone masterbatch. The halogen-free insulated cable material of the present invention has excellent insulating property and flame retardancy, and can achieve the halogen-free flame retardant VW-1, and releases a very low amount of smoke when burning, making a light transmittance of greater than 90% in the smoke, and also has excellent mechanical properties and electrical properties, and can suffer capacitance change rate test at 90° C. for 14 days in water according to UL44, fully meeting the property requirements of UL4703-2010 standard.

9 Claims, No Drawings

HALOGEN-FREE INSULATED CABLE MATERIAL USED FOR 125C IRRADIATION CROSS-LINKED EPCV PHOTOVOLTAICS AND A PREPARATION METHOD THEREOF

TECHNICAL FIELD

The present invention relates to a low-smoke halogen-free power cable material and a preparation method thereof, specifically relates to a low-smoke halogen-free insulated cable material used for 125° C. irradiation cross-linked EPCV photovoltaics and a preparation method thereof.

BACKGROUND ART

With the conventional energy supply crisis in the world becoming increasingly serious, large-scale exploitation and utilization of petrochemical energy has become one of the main causes of environmental pollution and deterioration of human living environment, and thus finding new energy sources has become a hot issue in the world. In all kinds of new energy sources, solar photovoltaic power generation has the advantages of non-pollution, sustainability, large amount, wide distribution, various forms for application and so on, and thus is highly concerned by the world.

Photovoltaic cable is an important part of the photovoltaic power generation. The security and reliability of photovoltaic cable are very important for photovoltaic power generation system, and mainly depend on the photovoltaic cable material. Currently, the most widely used material in the field of photovoltaic cable is XLPE-based material. However, in the application process, XLPE-based photovoltaic cable material has disadvantages of large hardness, inconvenient installation in a narrow space, and being unable to achieve low-smoke halogen-free VW-1 flame retardant grade, etc.

EPCV is a blend of rubber and plastic, and has excellent elasticity and high filling property from rubber and excellent mechanical properties and processability from plastic. When EPCV is applied to photovoltaic cable, the photovoltaic cable not only has excellent mechanical properties and electrical properties, and also has excellent flame retardancy, which can achieve the halogen-free flame retardant VW-1 grade. Also, it does not include phosphorus-nitrogen based flame retardant and releases a very low amount of smoke in combustion process, which is truly green and environmentally friendly. Therefore, EPCV photovoltaic insulated material has excellent economic and social benefits.

CN102766293A discloses an irradiation cross-linked low-smoke halogen-free red phosphorus-free flame retardant material, which comprises the following components: 10-80 parts by weight of ethylene-vinyl acetate copolymer, 5-30 parts by weight of ethylene-octylene copolymer and/or ethylene-butylene copolymer and/or ethylene propylene diene monomer, 0-100 parts by weight of polyethylene, 1-20 parts by weight of a polymer compatibilizer, 0.5-10 parts by weight of organosilicon polymer, 1-10 parts by weight of a composite anti-oxidant, 0-200 parts by weight of aluminium hydroxide and/or magnesium hydroxide and/or modified aluminium hydroxide and/or modified magnesium hydroxide, 0.1-100 parts by weight of high molecular weight ammonium polyphosphate and/or 0.1-50 parts by weight of a phosphate ester flame retardant and/or 0.1-50 parts by weight of melamine cyanurate. The material reaches American UL224VW-1 standard flame retardant grade when applied in heat-shrinkable sleeve, and reaches American UL1581VW-1 standard when applied in electric wires and cables, and does not contain halogen or red phosphorus, and thus is environmentally friendly.

CONTENTS OF THE INVENTION

Aiming at the problems in the prior art, one of the objects of the present invention lies in providing a low-smoke halogen-free insulated cable material used for 125° C. irradiation cross-linked EPCV photovoltaics. The halogen-free insulated cable material has excellent insulating property and flame retardancy, and releases a very low amount of smoke when burning, and the light transmittance in the smoke is high. Meanwhile, the material has excellent mechanical properties and electrical properties.

In order to achieve the above purpose, the present invention utilizes the following technical solutions:

A low-smoke halogen-free insulated cable material used for 125° C. irradiation cross-linked EPCV photovoltaics, being mainly prepared from the following raw materials based on weight parts:
  5-20 parts of ethylene propylene diene monomer;
  0-25 parts of polyethylene;
  0-10 parts of ethylene-vinyl acetate copolymer;
  1-5 parts of compatibilizer;
  50-75 parts of aluminum hydroxide;
  1-5 parts of stabilizer;
  1-5 parts of silicone masterbatch.

The weight parts of the ethylene propylene diene monomer is for example 6 parts, 7 parts, 8 parts, 9 parts, 10 parts, 11 parts, 12 parts, 13 parts, 14 parts, 15 parts, 16 parts, 17 parts, 18 parts or 19 parts.

The weight parts of the polyethylene is for example 1 parts, 3 parts, 5 parts, 7 parts, 9 parts, 11 parts, 13 parts, 15 parts, 17 parts, 19 parts, 21 parts or 23 parts.

The weight parts of the ethylene-vinyl acetate copolymer is for example 0.5 parts, 1 parts, 2 parts, 3 parts, 4 parts, 5 parts, 6 parts, 7 parts, 8 parts or 9 parts.

The weight parts of the compatibilizer is for example 1.5 parts, 2 parts, 2.5 parts, 3 parts, 3.5 parts, 4 parts or 4.5 parts.

The weight parts of the aluminum hydroxide is for example 52 parts, 54 parts, 57 parts, 60 parts, 63 parts, 66 parts, 69 parts, 72 parts or 74 parts.

The weight parts of the stabilizer is for example 1.5 parts, 2 parts, 2.5 parts, 3 parts, 3.5 parts, 4 parts or 4.5 parts.

The weight parts of the silicone masterbatch is for example 1.5 parts, 2 parts, 2.5 parts, 3 parts, 3.5 parts, 4 parts or 4.5 parts.

Preferably, a low-smoke halogen-free insulated cable material used for 125° C. irradiation cross-linked EPCV photovoltaics, being mainly prepared from the following raw materials based on weight parts:
  8-18 parts of ethylene propylene diene monomer;
  2-23 parts of polyethylene;
  2-10 parts of ethylene-vinyl acetate copolymer;
  1-5 parts of compatibilizer;
  52-72 parts of aluminum hydroxide;
  1-5 parts of stabilizer;
  1-5 parts of silicone masterbatch.

Preferably, a low-smoke halogen-free insulated cable material used for 125° C. irradiation cross-linked EPCV photovoltaics, being mainly prepared from the following raw materials based on weight parts:
  10-18 parts of ethylene propylene diene monomer;
  5-20 parts of polyethylene;
  3-10 parts of ethylene-vinyl acetate copolymer;
  1-5 parts of compatibilizer;
  55-70 parts of aluminum hydroxide;

1-5 parts of stabilizer;
1-5 parts of silicone masterbatch.

The above low-smoke halogen-free insulated cable materials used for 125° C. irradiation cross-linked EPCV photovoltaics can be prepared by blending and granulating using a conventional internal mixer and extruding and granulating using a extruder from formula amounts of raw materials.

Preferably, the ethylene propylene diene monomer (EPDM) has an ethylene to propylene segmer molar ratio of 60:40-70:30, with the third monomer being ethylidene norbornene which represents 1-3 wt % of the total weight of the three monomers, and has a number average molecular weight of 50-150 thousand, a mooney viscosity at 100° C. of 30-70 Pa·s and a shore A hardness of 20-50.

Preferably, the polyethylene is a low density polyethylene and has a number average molecular weight of 80-160 thousand and a melt index at 190° C. and 2.16 kg of 1-5 g/10 min.

Preferably, the ethylene-vinyl acetate copolymer has a content of vinyl acetate of 40-60 wt % and a melt index at 190° C. and 2.16 kg of 3-5 g/10 min.

Preferably, the compatibilizer is maleic anhydride grafted polyethylene with a grafting ratio of 1-2% and has a melt index at 190° C. and 2.16 kg of 1-3 g/10 min.

Preferably, the aluminum hydroxide is prepared by Bayer-sintering combination process. Preferably, the aluminum hydroxide is modified by aminosilane, and the particle size D50 thereof is 1-3 microns.

Preferably, the stabilizer is composed of the following components based on weight parts: 30-50 parts of calcium stearate, 5-40 parts of zinc stearate, and 30-60 parts of pentaerythrite tetra[β-(3,5-di-tert-butyl-4-hydroxyphenyl)-propionate].

Preferably, the silicone masterbatch is composed of the following components based on weight parts: 10-20 parts of low density polyethylene, 40-70 parts of siloxane, and 10-50 parts of silicon dioxide.

Preferably, the low density polyethylene has a number average molecular weight of 10-50 thousand and a melt index at 190° C. and 2.16 kg of 5-10 g/10 min.

Preferably, the siloxane is methylvinylsiloxane and has a number average molecular weight of 500-800 thousand.

Preferably, the silicon dioxide is a silicon dioxide prepared by precipitation methods and has a mesh number of 5000-6000.

The second purpose of the present invention is to provide a method for preparing the above low-smoke halogen-free insulated cable material used for 125° C. irradiation cross-linked EPCV photovoltaics. By blending and granulating using a conventional internal mixer and extruding and granulating using a extruder, the low-smoke halogen-free insulated cable material used for 125° C. irradiation cross-linked EPCV photovoltaics of the present invention can be obtained.

A method for preparing the above low-smoke halogen-free insulated cable material used for 125° C. irradiation cross-linked EPCV photovoltaics, comprising the following steps:
(1) melt-blending all the components based on formula amounts using an internal mixer, and then granulating using a single screw extruder;
(2) extruding the particles obtained by the step (1) into wires using an extruder;
(3) crosslinking the wires by radiation using an electron accelerator, and thus obtaining a low-smoke halogen-free insulated cable material used for 125° C. irradiation cross-linked EPCV photovoltaics.

Preferably, in step (1), the banburying temperature is 160-180° C., and the banburying time is 15-25 min.

The banburying temperature is for example 162° C., 164° C., 166° C., 168° C., 170° C., 172° C., 174° C., 176° C. or 178° C.

The banburying time is for example 16 min, 17 min, 18 min, 19 min, 20 min, 21 min, 22 min, 23 min or 24 min.

Preferably, in step (1), the single screw extruder can be divided into five zones, and the operating temperature in each zone is 110-120° C. for the first zone, 120-130° C. for the second zone, 130-140° C. for the third zone, 140-150° C. for the fourth zone, and 150-160° C. for the fifth zone.

The temperature in the first zone is for example 111° C., 112° C., 113° C., 114° C., 115° C., 116° C., 117° C., 118° C. or 119° C.

The temperature in the second zone is for example 121° C., 122° C., 123° C., 124° C., 125° C., 126° C., 127° C., 128° C. or 129° C.

The temperature in the third zone is for example 131° C., 132° C., 133° C., 134° C., 135° C., 136° C., 137° C., 138° C. or 139° C.

The temperature in the fourth zone is for example 141° C., 142° C., 143° C., 144° C., 145° C., 146° C., 147° C., 148° C. or 149° C.

The temperature in the fifth zone is for example 151° C., 152° C., 153° C., 154° C., 155° C., 156° C., 157° C., 158° C. or 159° C.

Preferably, in step (2), the extruder can be divided into four zones, and the operating temperature in each zone is 130-140° C. for the first zone, 140-150° C. for the second zone, 150-160° C. for the third zone, and 160-180° C. for the fourth zone.

The temperature in the first zone is for example 131° C., 132° C., 133° C., 134° C., 135° C., 136° C., 137° C., 138° C. or 139° C.

The temperature in the second zone is for example 141° C., 142° C., 143° C., 144° C., 145° C., 146° C., 147° C., 148° C. or 149° C.

The temperature in the third zone is for example 151° C., 152° C., 153° C., 154° C., 155° C., 156° C., 157° C., 158° C. or 159° C.

The temperature in the fourth zone is for example 161° C., 163° C., 165° C., 167° C., 169° C., 171° C., 173° C., 175° C., 177° C. or 179° C.

Compared with the prior art, the present invention has the following beneficial effects: the product of the present invention has excellent insulating property and flame retardancy, and can achieve the halogen-free flame retardant VW-1, and releases a very low amount of smoke when burning, making a light transmittance of greater than 90% in the smoke, and also has excellent mechanical properties and electrical properties, and can suffer capacitance change rate test at 90° C. for 14 days in water according to UL44, fully meeting the property requirements of UL4703-2010 standard.

EMBODIMENTS

Hereinafter, the technical solutions of the present application are further described by the specific embodiments.

Example 1

A low-smoke halogen-free insulated cable material used for 125° C. irradiation cross-linked EPCV photovoltaics, being mainly prepared from the following raw materials based on weight parts: 13 parts of ethylene propylene diene monomer (EPDM), 10 parts of polyethylene, 5 parts of ethylene-vinyl acetate copolymer, 2 parts of compatibilizer, 65 parts of aluminum hydroxide, 3 parts of stabilizer, and 2 parts of silicone masterbatch.

The ethylene propylene diene monomer (EPDM) has an ethylene to propylene segmer molar ratio of 65:35, with the third monomer being ethylidene norbornene which represents 2 wt % of the total weight of the three monomers, and has a number average molecular weight of 100 thousand, a mooney viscosity at 100° C. of 50 Pa·s and a shore A hardness of 45.

The polyethylene is a low density polyethylene and has a number average molecular weight of 120 thousand and a melt index at 190° C. and 2.16 kg of 5 g/10 min.

The ethylene-vinyl acetate copolymer has a content of vinyl acetate of 50 wt % and a melt index at 190° C. and 2.16 kg of 5 g/10 min.

The compatibilizer is maleic anhydride grafted polyethylene with a grafting ratio of 2% and has a melt index at 190° C. and 2.16 kg of 2 g/10 min.

The aluminum hydroxide is prepared by Bayer-sintering combination process and modified by aminosilane, and the particle size D50 thereof is 2 microns.

The stabilizer is composed of the following components based on weight parts: 30 parts of calcium stearate, 10 parts of zinc stearate, and 60 parts of pentaerythrite tetra[β-(3,5-di-tert-butyl-4-hydroxyphenyl)-propionate].

The silicone masterbatch is composed of the following components based on weight parts: 10 parts of low density polyethylene, 50 parts of siloxane, and 40 parts of silicon dioxide. The low density polyethylene has a number average molecular weight of 40 thousand and a melt index at 190° C. and 2.16 kg of 8 g/10 min. The siloxane is methylvinylsiloxane and has a number average molecular weight of 800 thousand. The silicon dioxide is a silicon dioxide prepared by precipitation methods and has a mesh number of 6000.

The preparation method of the above low-smoke halogen-free insulated cable material used for 125° C. irradiation cross-linked EPCV photovoltaics comprises the following steps:

(1) weighing accurately each component according to the formula;

(2) melt-blending all the weighed raw materials using an internal mixer, and then granulating using a single screw extruder successively;

(3) extruding the obtained particles into wires using an extruder;

(4) crosslinking the wires by radiation using an electron accelerator.

The specific parameters for melt-blending each component using an internal mixer are that: the banburying temperature is 160-180° C., and the banburying time is 15-25 min.

In step (2), the single screw extruder can be divided into five zones, and the operating temperature in each zone is 110-120° C. for the first zone, 120-130° C. for the second zone, 130-140° C. for the third zone, 140-150° C. for the fourth zone, and 150-160° C. for the fifth zone.

In step (3), the extruder can be divided into four zones, and the operating temperature in each zone is 130-140° C. for the first zone, 140-150° C. for the second zone, 150-160° C. for the third zone, and 160-180° C. for the fourth zone.

Example 2

A low-smoke halogen-free insulated cable material used for 125° C. irradiation cross-linked EPCV photovoltaics, being mainly prepared from the following raw materials based on weight parts: 14 parts of ethylene propylene diene monomer (EPDM), 5 parts of polyethylene, 5 parts of ethylene-vinyl acetate copolymer, 3 parts of compatibilizer, 68 parts of aluminum hydroxide, 2 parts of stabilizer, and 3 parts of silicone masterbatch.

The ethylene propylene diene monomer (EPDM) has an ethylene to propylene segmer molar ratio of 65:35, with the third monomer being ethylidene norbornene which represents 2 wt % of the total weight of the three monomers, and has a number average molecular weight of 100 thousand, a mooney viscosity at 100° C. of 50 Pa·s and a shore A hardness of 45.

The polyethylene is a low density polyethylene and has a number average molecular weight of 120 thousand and a melt index at 190° C. and 2.16 kg of 5 g/10 min.

The ethylene-vinyl acetate copolymer has a content of vinyl acetate of 50 wt % and a melt index at 190° C. and 2.16 kg of 5 g/10 min.

The compatibilizer is maleic anhydride grafted polyethylene with a grafting ratio of 2% and has a melt index at 190° C. and 2.16 kg of 2 g/10 min.

The aluminum hydroxide is prepared by Bayer-sintering combination process and modified by aminosilane, and the particle size D50 thereof is 2 microns.

The stabilizer is composed of the following components based on weight parts: 30 parts of calcium stearate, 10 parts of zinc stearate, and 60 parts of pentaerythrite tetra[β-(3,5-di-tert-butyl-4-hydroxyphenyl)-propionate].

The silicone masterbatch is composed of the following components based on weight parts: 10 parts of low density polyethylene, 50 parts of siloxane, and 40 parts of silicon dioxide. The low density polyethylene has a number average molecular weight of 40 thousand and a melt index at 190° C. and 2.16 kg of 8 g/10 min. The siloxane is methylvinylsiloxane and has a number average molecular weight of 800 thousand. The silicon dioxide is a silicon dioxide prepared by precipitation methods and has a mesh number of 6000 mesh.

The above low-smoke halogen-free insulated cable material used for 125° C. irradiation cross-linked EPCV photovoltaics is prepared using the same method as Example 1.

Example 3

A low-smoke halogen-free insulated cable material used for 125° C. irradiation cross-linked EPCV photovoltaics, being mainly prepared from the following raw materials based on weight parts: 13 parts of ethylene propylene diene monomer (EPDM), 5 parts of polyethylene, 5 parts of ethylene-vinyl acetate copolymer, 2 parts of compatibilizer, 70 parts of aluminum hydroxide, 2 parts of stabilizer, and 3 parts of silicone masterbatch.

The ethylene propylene diene monomer (EPDM) has an ethylene to propylene segmer molar ratio of 65:35, with the third monomer being ethylidene norbornene which represents 2 wt % of the total weight of the three monomers, and has a number average molecular weight of 100 thousand, a mooney viscosity at 100° C. of 50 Pa·s and a shore A hardness of 45.

The polyethylene is a low density polyethylene and has a number average molecular weight of 120 thousand and a melt index at 190° C. and 2.16 kg of 1-5 g/10 min.

The ethylene-vinyl acetate copolymer has a content of vinyl acetate of 50 wt % and a melt index at 190° C. and 2.16 kg of 5 g/10 min.

The compatibilizer is maleic anhydride grafted polyethylene with a grafting ratio of 2% and has a melt index at 190° C. and 2.16 kg of 2 g/10 min.

The aluminum hydroxide is prepared by Bayer-sintering combination process and modified by aminosilane, and the particle size D50 thereof is 2 microns.

The stabilizer is composed of the following components based on weight parts: 30 parts of calcium stearate, 10 parts of zinc stearate, and 60 parts of pentaerythrite tetra[β-(3,5-di-tert-butyl-4-hydroxyphenyl)-propionate].

The silicone masterbatch is composed of the following components based on weight parts: 10 parts of low density polyethylene, 50 parts of siloxane, and 40 parts of silicon dioxide. The low density polyethylene has a number average molecular weight of 40 thousand and a melt index at 190° C. and 2.16 kg of 4 g/10 min. The siloxane is methylvinylsiloxane and has a number average molecular weight of 800 thousand. The silicon dioxide is a silicon dioxide prepared by precipitation methods and has a mesh number of 6000.

The above low-smoke halogen-free insulated cable material used for 125° C. irradiation cross-linked EPCV photovoltaics is prepared using the same method as Example 1.

Example 4

A low-smoke halogen-free insulated cable material used for 125° C. irradiation cross-linked EPCV photovoltaics, being mainly prepared from the following raw materials based on weight parts: 15 parts of ethylene propylene diene monomer (EPDM), 5 parts of polyethylene, 5 parts of ethylene-vinyl acetate copolymer, 2 parts of compatibilizer, 69 parts of aluminum hydroxide, 2 parts of stabilizer, and 2 parts of silicone masterbatch.

The ethylene propylene diene monomer (EPDM) has an ethylene to propylene segmer molar ratio of 65:35, with the third monomer being ethylidene norbornene which represents 2 wt % of the total weight of the three monomers, and has a number average molecular weight of 100 thousand, a mooney viscosity at 100° C. of 50 Pa·s and a shore A hardness of 45.

The polyethylene is a low density polyethylene and has a number average molecular weight of 120 thousand and a melt index at 190° C. and 2.16 kg of 4 g/10 min.

The ethylene-vinyl acetate copolymer has a content of vinyl acetate of 50 wt % and a melt index at 190° C. and 2.16 kg of 5 g/10 min.

The compatibilizer is maleic anhydride grafted polyethylene with a grafting ratio of 2% and has a melt index at 190° C. and 2.16 kg of 2 g/10 min.

The aluminum hydroxide is prepared by Bayer-sintering combination process and modified by aminosilane, and the particle size D50 thereof is 2 microns.

The stabilizer is composed of the following components based on weight parts: 30 parts of calcium stearate, 10 parts of zinc stearate, and 60 parts of pentaerythrite tetra[β-(3,5-di-tert-butyl-4-hydroxyphenyl)-propionate].

The silicone masterbatch is composed of the following components based on weight parts: 10 parts of low density polyethylene, 50 parts of siloxane, and 40 parts of silicon dioxide. The low density polyethylene has a number average molecular weight of 40 thousand and a melt index at 190° C. and 2.16 kg of 8 g/10 min. The siloxane is methylvinylsiloxane and has a number average molecular weight of 800 thousand. The silicon dioxide is a silicon dioxide prepared by precipitation methods and has a mesh number of 6000.

The above low-smoke halogen-free insulated cable material used for 125° C. irradiation cross-linked EPCV photovoltaics is prepared using the same method as Example 1.

Example 5

A low-smoke halogen-free insulated cable material used for 125° C. irradiation cross-linked EPCV photovoltaics, being mainly prepared from the following raw materials based on weight parts: 10 parts of ethylene propylene diene monomer (EPDM), 5 parts of polyethylene, 10 parts of ethylene-vinyl acetate copolymer, 1 parts of compatibilizer, 60 parts of aluminum hydroxide, 2 parts of stabilizer, and 1 parts of silicone masterbatch.

The ethylene propylene diene monomer (EPDM) has an ethylene to propylene segmer molar ratio of 60:40, with the third monomer being ethylidene norbornene which represents 1 wt % of the total weight of the three monomers, and has a number average molecular weight of 50 thousand, a mooney viscosity at 100° C. of 30 Pa·s and a shore A hardness of 20.

The polyethylene is a low density polyethylene (LDPE) and has a number average molecular weight of 120 thousand and a melt index at 190° C. and 2.16 kg of 4 g/10 min. The ethylene-vinyl acetate copolymer has a content of vinyl acetate of 40% and a melt index at 190° C. and 2.16 kg of 3 g/10 min.

The compatibilizer is maleic anhydride grafted polyethylene with a grafting ratio of 1% and has a melt index at 190° C. and 2.16 kg of 1 g/10 min.

The aluminum hydroxide is prepared by Bayer-sintering combination process and modified by aminosilane, and the particle size D50 thereof is 1 microns.

The stabilizer is composed of the following components based on weight parts: 50 parts of calcium stearate, 5 parts of zinc stearate, and 30 parts of pentaerythrite tetra[β-(3,5-di-tert-butyl-4-hydroxyphenyl)-propionate].

The silicone masterbatch is composed of the following components based on weight parts: 10 parts of low density polyethylene, 40 parts of siloxane, and 10 parts of silicon dioxide. The low density polyethylene has a number average molecular weight of 10 thousand and a melt index at 190° C. and 2.16 kg of 5 g/10 min. The siloxane is methylvinylsiloxane and has a number average molecular weight of 500 thousand. The silicon dioxide is a silicon dioxide prepared by precipitation methods and has a mesh number of 5000.

The above low-smoke halogen-free insulated cable material used for 125° C. irradiation cross-linked EPCV photovoltaics is prepared using the same method as Example 1.

Example 6

A low-smoke halogen-free insulated cable material used for 125° C. irradiation cross-linked EPCV photovoltaics, being mainly prepared from the following raw materials based on weight parts: 18 parts of ethylene propylene diene monomer (EPDM), 12 parts of polyethylene, 8 parts of ethylene-vinyl acetate copolymer, 1.5 parts of compatibilizer, 66 parts of aluminum hydroxide, 3 parts of stabilizer, and 1.5 parts of silicone masterbatch.

The ethylene propylene diene monomer (EPDM) has an ethylene to propylene segmer molar ratio of 70:30, with the third monomer being ethylidene norbornene which represents 3 wt % of the total weight of the three monomers, and has a number average molecular weight of 150 thousand, a mooney viscosity at 100° C. of 70 Pa·s and a shore A hardness of 50.

The polyethylene is a low density polyethylene (LDPE) and has a number average molecular weight of 120 thousand and a melt index at 190° C. and 2.16 kg of 4 g/10 min.

The ethylene-vinyl acetate copolymer has a content of vinyl acetate of 60% and a melt index at 190° C. and 2.16 kg of 5 g/10 min.

The compatibilizer is maleic anhydride grafted polyethylene with a grafting ratio of 1.5% and has a melt index at 190° C. and 2.16 kg of 3 g/10 min.

The aluminum hydroxide is prepared by Bayer-sintering combination process and modified by aminosilane, and the particle size D50 thereof is 3 microns.

The stabilizer is composed of the following components based on weight parts: 40 parts of calcium stearate, 40 parts of zinc stearate, and 45 parts of pentaerythrite tetra[β-(3,5-di-tert-butyl-4-hydroxyphenyl)-propionate].

The silicone masterbatch is composed of the following components based on weight parts: 20 parts of low density polyethylene, 70 parts of siloxane, and 50 parts of silicon dioxide. The low density polyethylene has a number average molecular weight of 50 thousand and a melt index at 190° C. and 2.16 kg of 10 g/10 min. The siloxane is methylvinylsiloxane and has a number average molecular weight of 800 thousand. The silicon dioxide is a silicon dioxide prepared by precipitation methods and has a mesh number of 6000.

The above low-smoke halogen-free insulated cable material used for 125° C. irradiation cross-linked EPCV photovoltaics is prepared using the same method as Example 1.

Example 7

A low-smoke halogen-free insulated cable material used for 125° C. irradiation cross-linked EPCV photovoltaics, being mainly prepared from the following raw materials based on weight parts: 18 parts of ethylene propylene diene monomer (EPDM), 20 parts of polyethylene, 2 parts of compatibilizer, 56 parts of aluminum hydroxide, 2 parts of stabilizer, and 2 parts of silicone masterbatch.

The ethylene propylene diene monomer (EPDM) has an ethylene to propylene segmer molar ratio of 65:35, with the third monomer being ethylidene norbornene which represents 2 wt % of the total weight of the three monomers, and has a number average molecular weight of 100 thousand, a mooney viscosity at 100° C. of 50 Pa·s and a shore A hardness of 45.

The polyethylene is a low density polyethylene and has a number average molecular weight of 120 thousand and a melt index at 190° C. and 2.16 kg of 5 g/10 min.

The compatibilizer is maleic anhydride grafted polyethylene with a grafting ratio of 2% and has a melt index at 190° C. and 2.16 kg of 2 g/10 min.

The aluminum hydroxide is prepared by Bayer-sintering combination process and modified by aminosilane, and the particle size D50 thereof is 2 microns.

The stabilizer is composed of the following components based on weight parts: 30 parts of calcium stearate, 10 parts of zinc stearate, and 60 parts of pentaerythrite tetra[β-(3,5-di-tert-butyl-4-hydroxyphenyl)-propionate].

The silicone masterbatch is composed of the following components based on weight parts: 10 parts of low density polyethylene, 50 parts of siloxane, and 40 parts of silicon dioxide. The low density polyethylene has a number average molecular weight of 4 thousand and a melt index at 190° C. and 2.16 kg of 8 g/10 min. The siloxane is methylvinylsiloxane and has a number average molecular weight of 80 thousand. The silicon dioxide is a silicon dioxide prepared by precipitation methods and has a mesh number of 6000.

The above low-smoke halogen-free insulated cable material used for 125° C. irradiation cross-linked EPCV photovoltaics is prepared using the same method as Example 1.

The properties of the low-smoke halogen-free insulated cable materials used for 125° C. irradiation cross-linked EPCV photovoltaics of Examples 1-7 are tested, and the specific data are shown in the following table.

| Test Item | | Example 1 | Example 2 | Example 3 | Example 4 | Example 5 | Example 6 | Example 7 |
|---|---|---|---|---|---|---|---|---|
| Tensile strength | | 10.8 MPa | 10.5 MPa | 10.9 MPa | 11.2 MPa | 11.5 MPa | 12.1 MPa | 10.7 MPa |
| Breaking Elongation | | 188% | 169% | 174% | 183% | 182% | 185% | 186% |
| light transmittance in the smoke | | 93% | 95% | 96% | 95% | 96% | 96% | 94% |
| VW-1 vertical combustion test | | pass | pass | pass | pass | pass | pass | pass |
| capacitance change rate at 90° C. for 14 days in water | The first day and the fourteenth day | 1.5% | 1.8% | 1.4% | 1.9% | 1.3% | 1.5% | 1.6% |
| | The seventh day and the fourteenth day | 0.5% | 0.6% | 0.6% | 0.7% | 0.5% | 0.6% | 0.4% |

The applicant states that: the present application illustrates the detailed composition and method of the present invention by the above examples, but the present invention is not limited to the detailed composition and method, that is, it does not mean that the invention must be conducted relying on the above detailed composition and method. Those skilled in the art should understand that any modification to the present invention, any equivalent replacement of each raw material of the present invention and the addition of auxiliary ingredient, the selection of specific embodiment and the like all fall into the protection scope and the disclosure scope of the present invention.

The invention claimed is:

1. A halogen-free insulated cable material used for 125° C. irradiation cross-linked EPCV photovoltaics, characterized in that, it is prepared from the following raw materials based on weight parts:
   5-20 parts of ethylene propylene diene polymer;
   0-25 parts of polyethylene;
   0-10 parts of ethylene-vinyl acetate copolymer;
   1-5 parts of compatibilizer;
   50-75 parts of aluminum hydroxide;
   1-5 parts of stabilizer;
   1-5 parts of silicone masterbatch;
   the stabilizer is composed of the following components based on weight parts: 30-50 parts of calcium stearate, 5-40 parts of zinc stearate, and 30-60 parts of pentaerythrite tetra[β-(3,5-di-tert-butyl-4-hydroxyphenyl)-propionate];

the silicone masterbatch is composed of the following components based on weight parts: 10-20 parts of low density polyethylene, 40-70 parts of siloxane, and 10-50 parts of silicon dioxide.

2. The halogen-free insulated cable material of claim 1, characterized in that, the material is prepared from the following raw materials based on weight parts:
   8-18 parts of ethylene propylene diene polymer;
   2-23 parts of polyethylene;
   2-10 parts of ethylene-vinyl acetate copolymer;
   1-5 parts of compatibilizer;
   52-72 parts of aluminum hydroxide;
   1-5 parts of stabilizer;
   1-5 parts of silicone masterbatch.

3. The halogen-free insulated cable material of claim 1, characterized in that, the material is prepared from the following raw materials based on weight parts:
   10-18 parts of ethylene propylene diene polymer;
   5-20 parts of polyethylene;
   3-10 parts of ethylene-vinyl acetate copolymer;
   1-5 parts of compatibilizer;
   55-70 parts of aluminum hydroxide;
   1-5 parts of stabilizer;
   1-5 parts of silicone masterbatch.

4. The halogen-free insulated cable material of claim 1, characterized in that, the ethylene propylene diene polymer has an ethylene to propylene segment molar ratio of 60:40-70:30, with the third monomer being ethylidene norbornene which represents 1-3 wt % of the total weight of the three monomers, and has a number average molecular weight of 50-150 thousand, a mooney viscosity at 100° C. of 30-70 Pa·s and a shore A hardness of 20-50.

5. The halogen-free insulated cable material of claim 1, characterized in that, the polyethylene is a low density polyethylene and has a number average molecular weight of 80-160 thousand and a melt index at 190° C. and 2.16 kg of 1-5 g/10 min;
   the ethylene-vinyl acetate copolymer has a content of vinyl acetate of 40-60 wt % and a melt index at 190° C. and 2.16 kg of 3-5 g/10 min.

6. The halogen-free insulated cable material of claim 1, characterized in that, the compatibilizer is maleic anhydride grafted polyethylene with a grafting ratio of 1-2% and has a melt index at 190° C. and 2.16 kg of 1-3 g/10 min;
   the aluminum hydroxide is prepared by Bayer-sintering combination process;
   the aluminum hydroxide is modified by aminosilane, and the particle size D50 thereof is 1-3 microns.

7. The halogen-free insulated cable material of claim 1, characterized in that, the low density polyethylene has a number average molecular weight of 10-50 thousand and a melt index at 190° C. and 2.16 kg of 5-10 g/10 min;
   the siloxane is methylvinylsiloxane and has a number average molecular weight of 500-800 thousand;
   the silicon dioxide is a silicon dioxide prepared by precipitation methods and has a mesh number of 5000-6000.

8. A method for preparing the halogen-free insulated cable material of claim 1, characterized in that, the method comprises the following steps:
   (1) melt-blending all the components based on formula amounts using an internal mixer, and then granulating using a single screw extruder;
   (2) extruding the particles obtained by the step (1) into wires using an extruder;
   (3) crosslinking the wires by radiation using an electron accelerator, and thus obtaining a low-smoke halogen-free insulated cable material used for 125° C. irradiation cross-linked EPCV photovoltaics.

9. The method of claim 7, characterized in that, in step (1), the banburying temperature is 160-180° C., and the banburying time is 15-25 min;
   the single screw extruder in step (1) can be divided into five zones, and the operating temperature in each zone is 110-120° C. for the first zone, 120-130° C. for the second zone, 130-140° C. for the third zone, 140-150° C. for the fourth zone, and 150-160° C. for the fifth zone;
   in step (2), the extruder can be divided into four zones, and the operating temperature in each zone is 130-140° C. for the first zone, 140-150° C. for the second zone, 150-160° C. for the third zone, and 160-180° C. for the fourth zone.

* * * * *